(12) United States Patent
White et al.

(10) Patent No.: US 11,201,375 B2
(45) Date of Patent: Dec. 14, 2021

(54) RECONFIGURABLE BATTERY ELECTRIC VEHICLE

(71) Applicant: GM GLOBAL TECHNOLOGY OPERATIONS LLC, Detroit, MI (US)

(72) Inventors: Andrew W. White, Shelby Township, MI (US); Terry A. Swartzell, Ann Arbor, MI (US); David A. Saari, Macomb Township, MI (US); Charles N. Kriete, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 16/710,225

(22) Filed: Dec. 11, 2019

(65) Prior Publication Data

US 2021/0184191 A1 Jun. 17, 2021

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
CPC ...................................................... B60K 1/04
See application file for complete search history.

(56) References Cited

U.S. PATENT DOCUMENTS

| 9,440,555 | B2 * | 9/2016 | Garfinkel | ................ | B60L 58/27 |
| 2007/0238018 | A1 * | 10/2007 | Lee | ........................ | H01M 50/20 |
| | | | | | 429/159 |
| 2012/0312612 | A1 * | 12/2012 | Harrison, III | ............ | B60K 1/04 |
| | | | | | 180/68.5 |

* cited by examiner

*Primary Examiner* — James A Shriver, II
*Assistant Examiner* — James J Triggs
(74) *Attorney, Agent, or Firm* — Cantor Colburn LLP

(57) ABSTRACT

A battery electric vehicle includes a pair of spaced apart and substantially parallel longitudinal members and a floor pan coupled to and above at least a portion of the longitudinal members. A battery pack bay is defined below the floor pan, longitudinally between predefined front and rear limits, and laterally between the longitudinal members. A battery pack may be upwardly disposed within the battery pack bay, the battery pack including a pair of laterally spaced apart sides whereat the first battery pack is removably attached to the respective longitudinal members. The battery pack may be dimensioned longitudinally to occupy less than the entire longitudinal space of the battery pack bay. A closeout structure may be removably attached to the respective longitudinal members and one longitudinal end of the first battery pack.

18 Claims, 3 Drawing Sheets

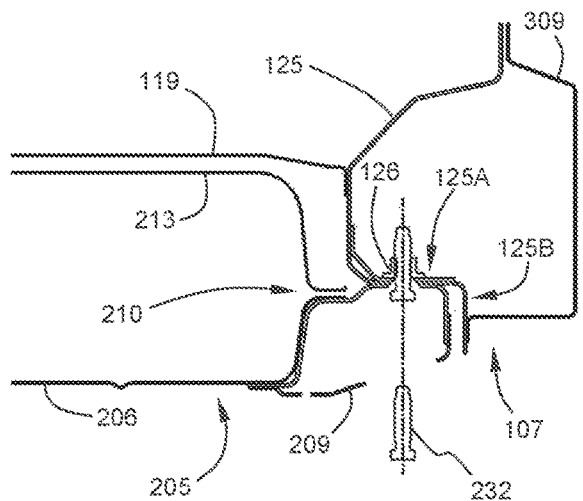
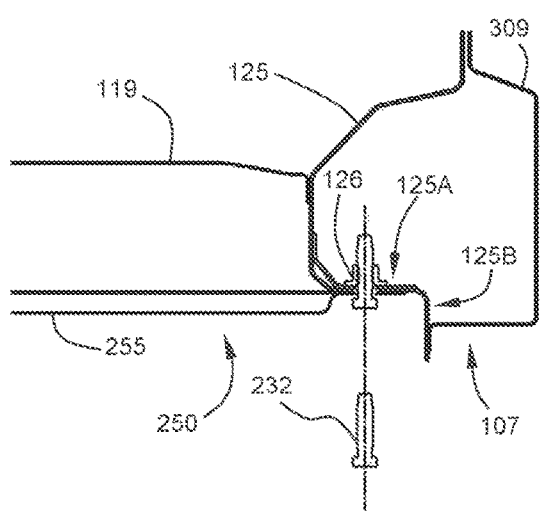
FIG. 3
FIG. 4
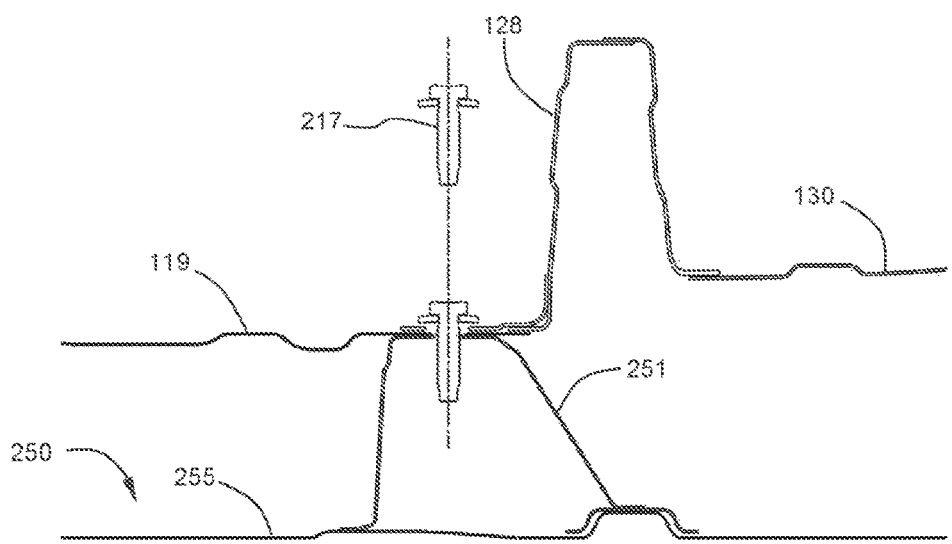
FIG. 5
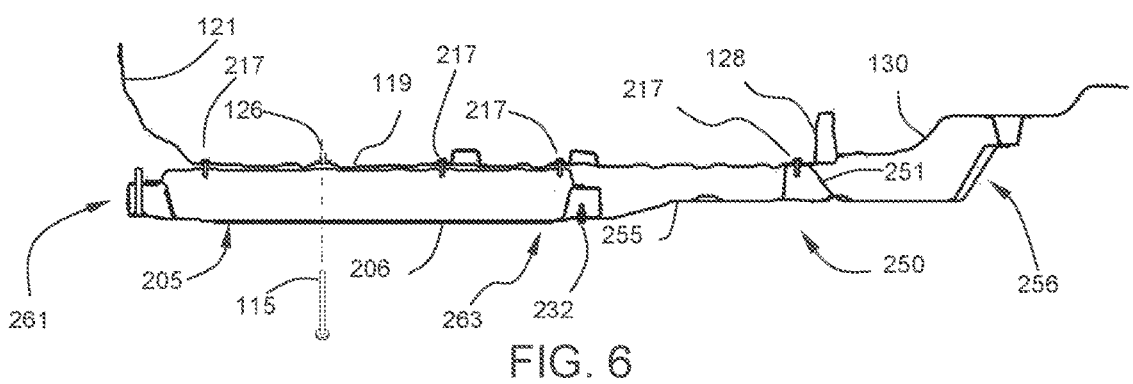
FIG. 6

RECONFIGURABLE BATTERY ELECTRIC VEHICLE

INTRODUCTION

Battery electric vehicles, including pure electric and range extended versions, may deliver wheel torque through a variety of drive configurations. Such drive configurations may include motor-at-wheel and various motor/transmission architectures. Certain battery electric vehicle powertrain configurations do not require packaging volume beneath the vehicle passenger compartment for motor and driveline components. Such configurations advantageously utilize this free volume for packaging the electric batteries required for driving the traction motor(s) of the powertrain.

Most, if not all, of the available space below the floor pan of a battery electric vehicle may be utilized as a battery pack bay. Battery packs may be modular to the extent that the number of battery modules may be varied to accommodate a desired energy density or range objectives. Battery electric vehicles, however, benefit structurally from battery pack enclosures that span the available space below a vehicle. Thus, while a battery electric vehicle may be readily decontented in terms of energy capacity, the actual battery pack enclosure structure may not without negatively impacting the structural integrity of the vehicle.

SUMMARY

In one exemplary embodiment, a battery electric vehicle includes a pair of spaced apart and substantially parallel longitudinal members and a floor pan coupled to and above at least a portion of the longitudinal members. A battery pack bay is defined below the floor pan, longitudinally between predefined front and rear limits, and laterally between the longitudinal members. A first battery pack may be upwardly disposed within the battery pack bay, the battery pack including a pair of laterally spaced apart sides whereat the first battery pack is removably attached to the respective longitudinal members. The first battery pack may be dimensioned longitudinally to occupy less than the entire longitudinal space of the battery pack bay. A closeout structure may be removably attached to the respective longitudinal members and one longitudinal end of the first battery pack.

In addition to one or more of the features described herein, the closeout structure may include a cross-braced panel.

In addition to one or more of the features described herein, the closeout structure may include at least one hat bracket attached to the closeout structure and removably attached to the floor pan.

In addition to one or more of the features described herein, the closeout structure may include a lateral member at a longitudinal end opposite the one longitudinal end of the first battery pack and removably attached to the floor pan between the longitudinal members.

In addition to one or more of the features described herein, the longitudinal members may include a plurality of mounting provisions distributed along substantially the entire lengths thereof and configured for removable attachment of a second battery pack dimensioned to occupy substantially the entire longitudinal space of the battery pack bay.

In addition to one or more of the features described herein, the longitudinal members may include a set of mounting provisions distributed substantially along the entire lengths thereof and configured for removable attachment of a first battery pack dimensioned longitudinally to occupy substantially the entire longitudinal space of the battery pack bay, the first battery pack being removably attached to the respective longitudinal members at a first sub-set of the mounting provisions, the closeout structure removably attached to the respective longitudinal members at a second subset of the mounting provisions.

In addition to one or more of the features described herein, the pair of spaced apart and substantially parallel longitudinal members may include rocker assemblies.

In addition to one or more of the features described herein, the first battery pack may be positioned between the spaced apart longitudinal members fully forward in the longitudinal space of the battery pack bay, and the closeout structure may be positioned between the spaced apart longitudinal members and between the one longitudinal end of the first battery pack and the predefined rear limit.

In addition to one or more of the features described herein, the first battery pack may be positioned between the spaced apart longitudinal members fully rearward in the longitudinal space of the battery pack bay, and the closeout structure may be positioned between the spaced apart longitudinal members and between the one longitudinal end of the first battery pack and the predefined front limit.

In addition to one or more of the features described herein, the first battery pack may be positioned between the spaced apart longitudinal members intermediate in the longitudinal space of the battery pack bay, and the closeout structure may be positioned between the spaced apart longitudinal members and between the other end of the first battery pack and the other of the predefined front and rear limits opposing the other end of the first battery pack.

In another exemplary embodiment, a method for configuring a battery electric vehicle includes providing a vehicle structure including a battery pack bay beneath a floor pan of the vehicle, including predefined front and rear limits defining an available longitudinal space of the battery pack bay and an available lateral space between a pair of spaced apart longitudinal members. The method further includes selectively assembling the vehicle in one of a first configuration and a second configuration. Assembling the vehicle in the first configuration includes installing a first battery pack to the spaced apart longitudinal members, the first battery pack being dimensioned to occupy substantially the entire available longitudinal space of the battery pack bay. Assembling the vehicle in the second configuration includes installing a second battery pack to the spaced apart longitudinal members, the second battery pack being dimensioned to occupy less than the entire available longitudinal space of the battery pack bay, installing a first closeout structure to the spaced apart longitudinal members and to one longitudinal end of the second battery pack, and extending the first closeout structure substantially to the one of the predefined front and rear limits opposing the one longitudinal end of the second battery pack.

In addition to one or more of the features described herein, installing the first and second battery packs includes removably installing the battery packs.

In addition to one or more of the features described herein, assembling the vehicle in the second configuration includes installing the second battery pack between the spaced apart longitudinal members fully forward in the longitudinal space of the battery pack bay, and installing the first closeout structure between the spaced apart longitudinal members and between the one longitudinal end of the second battery pack and the predefined rear limit.

In addition to one or more of the features described herein, assembling the vehicle in the second configuration includes installing the second battery pack between the spaced apart longitudinal members fully rearward in the longitudinal space of the battery pack bay, and installing the first closeout structure between the spaced apart longitudinal members and between the one longitudinal end of the second battery pack and the predefined front limit.

In addition to one or more of the features described herein, assembling the vehicle in the second configuration includes installing the second battery pack between the spaced apart longitudinal members intermediate in the longitudinal space of the battery pack bay, and installing a second closeout structure between the spaced apart longitudinal members and between the other end of the second battery pack and the other of the predefined front and rear limits opposing the other end of the second battery pack.

In yet another exemplary embodiment, a battery electric vehicle includes a pair of spaced apart and substantially parallel longitudinal members, and a floor pan coupled to and above at least a portion of the longitudinal members, wherein a battery pack bay is defined below the floor pan, laterally between the longitudinal members and longitudinally between predefined front and rear limits. The longitudinal members include a set of mounting provisions distributed substantially along the entire lengths thereof and configured to receive fasteners to removably secure one of a first battery pack or a combination of a second battery pack and a closeout structure. The first battery pack may be dimensioned to occupy substantially the entire longitudinal space of the battery pack bay between the front and rear limits. The second battery pack may be dimensioned to occupy less than the entire available longitudinal space of the battery pack bay between one of the front and rear limits and a longitudinal position intermediate the front and rear limits, and the closeout structure may be dimensioned to cover at least a majority of the battery pack bay between the intermediate longitudinal position and the other of the front and rear limits.

In addition to one or more of the features described herein, the pair of spaced apart and substantially parallel longitudinal members may include rocker assemblies.

In addition to one or more of the features described herein, the mounting provisions comprising weld nuts.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 illustrates a sectional view through a portion of the battery pack assembled to the vehicle structure of FIG. 2, in accordance with the present disclosure;

FIG. 4 illustrates a sectional view through a portion of a closeout structure assembled to the vehicle structure of FIG. 2, in accordance with the present disclosure;

FIG. 5 illustrates a sectional view through a portion of a closeout structure assembled to the vehicle structure of FIG. 2, in accordance with the present disclosure; and FIG. 6 illustrates a sectional view through an entire battery pack bay including a battery pack and closeout structure assembled to the vehicle structure of FIG. 2, in accordance with the present disclosure.

DETAILED DESCRIPTION

Figure 1:
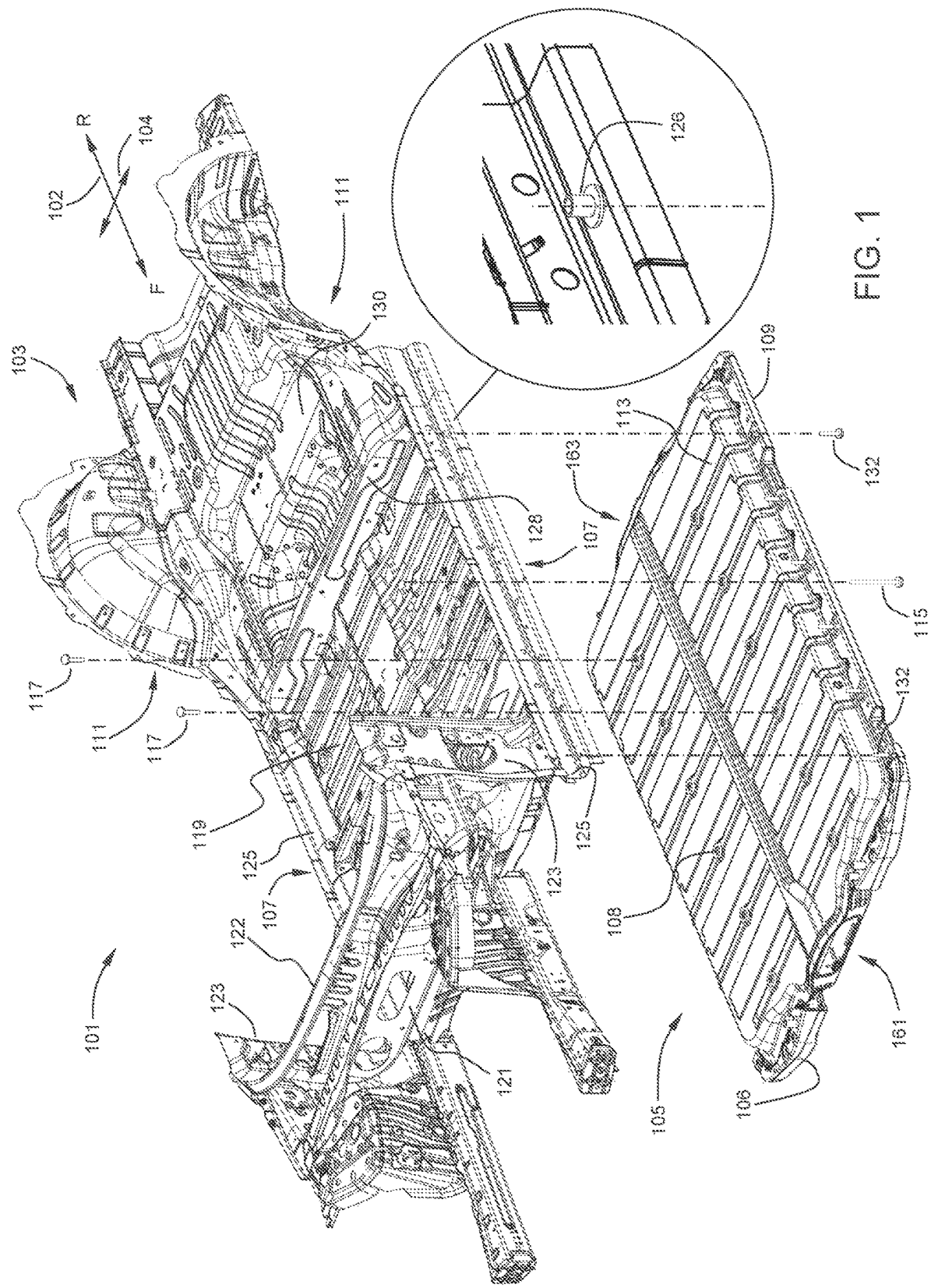
FIG. 1 illustrates an exemplary unibody structure and a first exemplary battery pack for a battery electric vehicle, in accordance with the present disclosure.

The following description is merely exemplary in nature and is not intended to limit the present disclosure, its application or uses. Throughout the drawings, corresponding reference numerals indicate like or corresponding parts and features.

FIG. 1 illustrates an exemplary unibody structure and exemplary first battery pack for a battery electric vehicle 101. A partial isometric view of an automotive unibody structure 103 is illustrated relative to longitudinal and lateral axes, 102, 104 respectively, with the front and rear of the vehicle designated as F and R, respectively. Windshield cross member 122 extends substantially laterally between the tops of left and right front door hinge pillars 123. A dash panel 121 extends substantially laterally along the lower extent of the windshield cross member 122 between the left and right front door hinge pillars 123. The front door hinge pillars 123 extend upwardly from the front of a respective rocker assembly 107 which may include an elongated inner rocker panel 125 and an elongated outer rocker closeout panel 309 (FIG. 3). The rocker assemblies 107 extend rearwardly, substantially in parallel, from the base of the respective front door hinge pillars 123 and may terminate in the region of respective rear wheel well closeout panels 111. Floor pan 119 may span laterally between the rocker assemblies 107 and longitudinally between the dash panel 121 to a rear waterfall member 128 which may rise from the floor pan 119 to a rear seat pan 130. As used herein, floor pan may refer to either or both floor pan 119 and rear seat pan 130. The rear waterfall member 128 may span substantially laterally between the rocker assemblies 107 toward the rear thereof and forward of the rear wheel well closeouts panels 111. An area generally beneath the floor pan 119 and between the rocker assemblies 107 provides lateral space for a battery pack. Longitudinal space for a battery pack may be provided substantially along the entire length of the rocker assemblies 107. The lateral limits of the battery pack bay may be defined by the design dimensioning between the rocker assemblies 107. The longitudinal limits of the battery pack bay may be substantially limited by the length of the rocker assemblies 107 since, in accordance with the present disclosure, they provide the lateral attachment points for a battery pack. Alternatively or additionally, the longitudinal limits of the battery pack bay may be limited by hard physical stops of lateral vehicle structure defining limits of available space beneath the vehicle for a battery bay. Alternatively or additionally, the longitudinal limits of the battery may be primarily driven by limits established by other design considerations. Regardless, for the purpose of the present disclosure, it is assumed that the battery bay is established longitudinally between predefined front and rear limits. The space available for a battery pack may be referred to herein as a battery pack bay.

An exemplary battery pack 105 may include a lower tray 106 and upper cover 113. The battery pack 105 may house a plurality of modular battery enclosures in a sealed but serviceable manner. The lower tray 106 may be sealably coupled to the upper cover 113 around the entire perimeter of the battery pack 105. An outer lip 109 may extend around the perimeter of the battery pack 105 and provide an area outside of the sealed interface between the lower tray 106 and upper cover 113 for a plurality of mounting openings through which mounting hardware such as bolts 132 may provide structural engagement of the battery pack 105 to the automotive unibody structure 103 within the battery pack bay. In one embodiment, a plurality of bolts secure the battery pack 105 to the inner rocker panels 125 of rocker assemblies 107 via a complementary number of weld nuts 126 as shown in the inset detail of FIG. 1. Battery pack 105 may include one or more mounting provisions 108 such as threaded receivers to which bolts 117 engage through the floor pan 119 to further structurally secure the battery pack 105 to the automotive unibody structure 103. Additionally or alternatively, the battery pack 105 may include one or more mounting provisions 108 for passing bolts 115 through from below to engage fasteners such as weld nuts on the upper side of the floor pan 119. The battery pack 105 may be considered a full-size battery pack assuming it occupies substantially the entirety of the battery pack bay between the front and rear limits. It can be appreciated that the battery pack 105 has longitudinally opposite front and rear ends 161 and 163 which correspond to the front and rear limits, respectively, of the battery pack bay.

Figure 2:
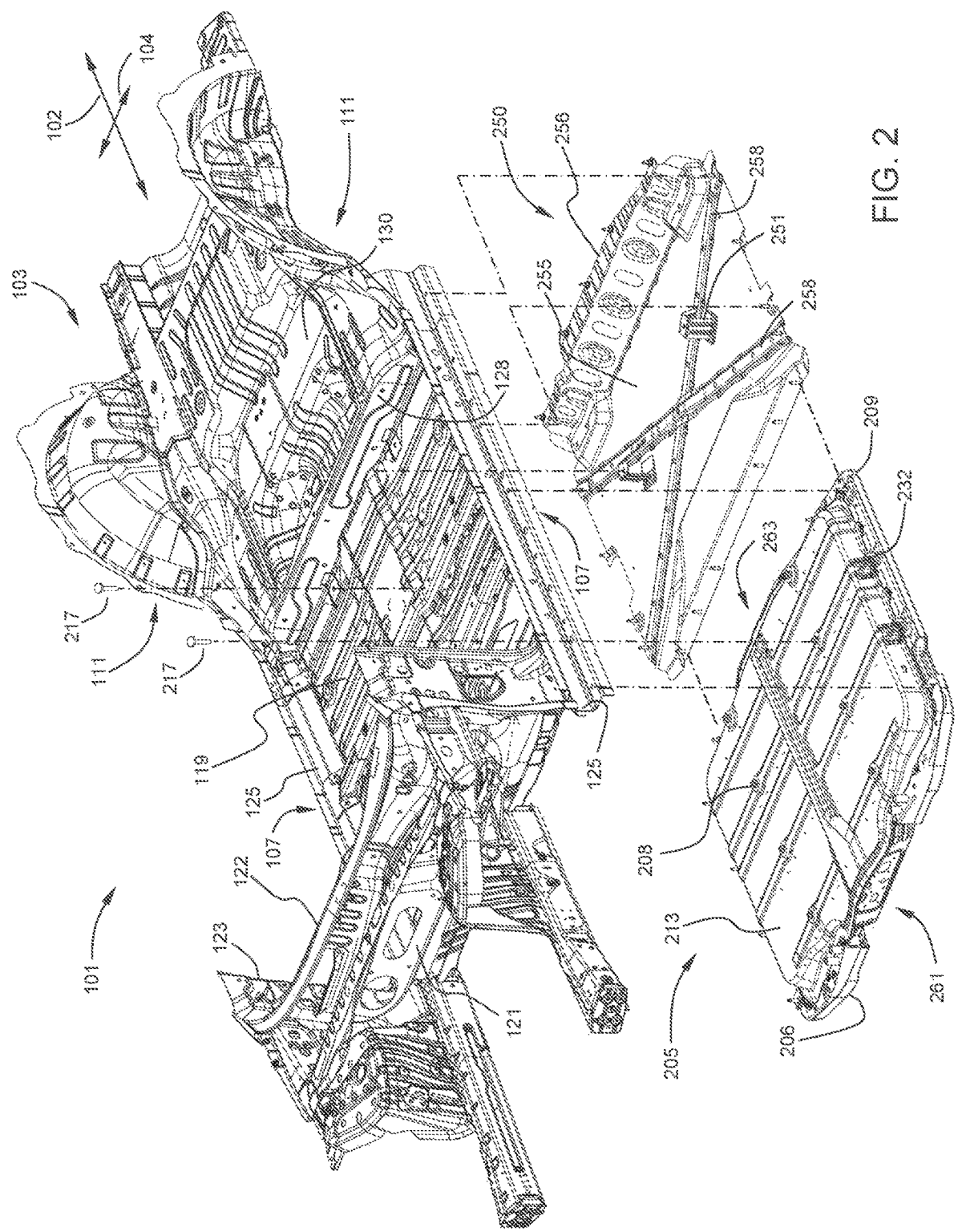
FIG. 2 illustrates the exemplary unibody structure of FIG. 1 and an exemplary second battery pack and closeout structure for a battery electric vehicle, in accordance with the present disclosure.

FIG. 2 illustrates an exemplary unibody structure and an exemplary battery pack 205 and closeout structure 250 for a battery electric vehicle. Similar or identical features between the automotive unibody structure 103 in both FIG. 1 and FIG. 2 are similarly labeled.

An exemplary battery pack 205 may include a lower tray 206 and upper cover 213. The second battery pack 205 may house a plurality of modular battery enclosures in a sealed but serviceable manner. The lower tray 206 may be sealably coupled to the upper cover 213 around the entire perimeter of the battery pack 205. An outer mounting lip 209 may extend around the perimeter of the battery pack 205 and provide an area outside of the sealed interface between the lower tray 206 and upper cover 213 for a plurality of mounting openings through which mounting hardware such as bolts 232 may provide structural engagement of the battery pack 205 to the automotive unibody structure 103 within the battery pack bay in a manner substantially similar to the battery pack 105. In one embodiment, a plurality of bolts secures the battery pack 205 to the inner rocker panels 125 of rocker assemblies 107 via a complementary number of weld nuts 126 as shown in the inset detail of FIG. 1. The battery pack 205 may include one or more mounting provisions 208 such as threaded receivers to which bolts 217 engage through the floor pan 119 to further structurally secure the battery pack 205 to the automotive unibody structure 103. Additionally or alternatively, the battery pack 205 may include one or more mounting provisions 208 for passing bolts 115 through from below to engage fasteners such as weld nuts 126 on the upper side of the floor pan 119 in a manner substantially similar to that disclosed herein with respect to the battery pack 105 in FIG. 1. The battery pack 205 may be considered a partial battery pack assuming it occupies less than the entirety of the battery pack bay between the front and rear limits. It can be appreciated that the battery pack 205 has longitudinally opposite front and rear ends 261 and 263. In the illustrated embodiment, battery pack is fully forward in the battery pack bay with the front end 261 of battery pack 205 corresponding to the front limits of the battery pack bay. In this embodiment, the rear end 263 of battery pack 205 is intermediate the front and rear limits of the battery pack bay and opposes the rear limit.

In the embodiment of FIG. 2, and in other embodiments wherein a battery pack occupies less than the entire lateral space between the front and rear limits of the battery pack bay, a closeout structure 250 is advantageously provided and assembled to the vehicle 101. With reference to the embodiment of FIG. 2, closeout structure 250 includes panel 255 and attaches to the rear end 263 of battery pack 205 and to the inner rocker panels 125 of rocker assemblies 107 via a number of weld nuts 126 as shown in the inset detail of FIG. 1. A lateral structural member 256 may be attached at its base to the panel 255 of closeout structure 250 and attached at its top to the floor pan 130 using bolt fasteners. Such a lateral structural member 256 may provide closeout at the rear of the battery pack bay. Alternatively, a body structural cross member may be available to which the rear of the closeout structure 250 attaches. Bracing, and more particularly cross bracing 258, preferably provides structural rigidity across the major area of the closeout structure 250. The closeout structure 250 further preferably includes one or more hat brackets 251 attached to the major area of the closeout structure 250 at their bases and to the floor pan 119 using bolt fasteners. Thus, the closeout structure 250 advantageously provides a stressed skin component to complete a structural torsion box with the rocker assemblies 107, lateral structural member 256, rear end 263 of battery pack 205, floor pan 119, rear seat pan 130 and rear waterfall member 128. Closeout structure 250, including lateral structural member 256, hat brackets 251 and cross bracing 258, preferably may be fabricated from welded steel stampings.

While the embodiment of FIG. 2 illustrates a partial battery pack fully forward in the battery pack bay with the front end 261 of battery pack 205 corresponding to the front limits of the battery pack bay, alternate embodiments are envisioned. In another embodiment, a partial battery pack may be fully rearward in the battery pack bay with the rear end of the battery pack corresponding to the rear limits of the battery pack bay. In such an alternative embodiment, a closeout structure may attach to the front end 261 of battery pack 205 and to the inner rocker panels 125 of rocker assemblies 107. The closeout structure may also attach to the floor pan 130 and provide closeout at the front of the battery pack bay. In an additional embodiment, a partial battery pack may be intermediate in the battery pack bay with the rear end of the battery pack spaced apart from the rear limits of the battery pack bay and the front end of the battery pack spaced apart from the front limits of the battery pack bay. In such an alternative embodiment, a closeout structure at each end of such a partial battery pack may attach as previously described at each end of the battery pack and provide the desired closeout and structural functionality described herein.

FIGS. 3-6 illustrate various sectional views showing vehicle structure, battery pack 205 and closeout structure 250 details in an assembled battery electric vehicle 101.

FIG. 3 is a sectional view taken along a longitudinal axis through battery pack 205 and rocker assembly 107 at an attachment point. Floor pan 119 is attached such as by welding to inner rocker panel 125. The inner rocker panel 125 may be substantially "C" shaped as illustrated with its opening to the right in the figure and may include a lower horizontal sill 125A extending outwardly therefrom and a terminal vertical lip 125B extending downwardly from the lower horizontal sill 125A. Rocker assembly 107 may further include outer rocker closeout panel 309 attached such as by welding toward the upper and lower extents of the inner rocker panel 125. Battery pack 205 is shown including the upper cover 213, lower tray 206 and a sealed interface 210 which may run the perimeter of the battery pack 205. Outboard of the sealed interface 210 is outer mounting lip 209 that may also run the perimeter of the battery pack 205. A plurality of weld nuts 126 may be welded at distributed locations on the top surface of lower horizontal sill 125A. Battery pack 205 may be removably attached to the rocker assemblies 207 from below via a bolts 232 and weld nuts 126.

FIG. 4 is a sectional view also taken along a longitudinal axis through closeout structure 250 and rocker assembly 107 at an attachment point. As described herein, floor pan 119 is attached such as by welding to inner rocker panel 125. The inner rocker panel 125 may be substantially "C" shaped as illustrated with its opening to the right in the figure and may include a lower horizontal sill 125A extending outwardly therefrom and a terminal vertical lip 125B extending downwardly from the lower horizontal sill 125A. Rocker assembly 107 may further include outer rocker closeout panel 309 attached such as by welding toward the upper and lower extents of the inner rocker panel 125. Closeout structure 250 is shown including the panel 255. A plurality of weld nuts 126 may be welded at distributed locations on the top surface of lower horizontal sill 125A. Closeout structure 250 may be removably attached to the rocker assemblies 207 from below via a bolts 232 and weld nuts 126.

FIG. 5 is a sectional view taken along a transverse axis axis through closeout structure 250 in the vicinity of hat bracket 251. As described herein, hat bracket 251 may be welded to panel 255 of closeout structure 250. Floor pan 119 and rear waterfall member 128 are attached such as by bolt 217 to the top of hat bracket 251.

FIG. 6 is a sectional view taken along a transverse axis through the entire length of the battery bay. Floor pan 119 extends from dash panel 121 at the front to waterfall member 128 and into rear seat pan 130. Battery pack 205 including lower tray 206 is illustrated fully forward in the battery pack bay with the front end 261 of battery pack 205 corresponding to the front limits of the battery pack bay. In this embodiment, the rear end 263 of battery pack 205 is intermediate the front and rear limits of the battery pack bay and opposes the rear limit of the battery pack bay. As set forth herein, battery pack 205 may be removably attached as illustrated in FIGS. 2 and 3 to the rocker assemblies 207 from below via bolts 232 and weld nuts 126. The battery pack 205 may further be attached to the floor pan 119 at a plurality of threaded receivers to which bolts 217 engage through the floor pan 119 to further structurally secure the battery pack 205. As described herein, additionally or alternatively, the battery pack 205 may include one or more mounting provisions 208 for passing bolts 115 through from below to engage fasteners such as weld nuts 126 on the upper side of the floor pan 119 in a manner substantially identical to that disclosed herein with respect to the battery pack 105 in FIG. 1. As described herein, hat bracket 251 may be welded to panel 255 of closeout structure 250. Floor pan 119 is attached such as by bolt 217 to the top of hat bracket 251. Panel 255 of closeout structure 250 may be attached to the rear end 263 of battery pack 205 such as by bolt 232. Lateral structural member 256 may be attached at its base to the panel 255 of closeout structure 250 as described herein and attached at its top to the floor pan 130 using bolt fasteners.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A battery electric vehicle, comprising:
   a pair of spaced apart and substantially parallel longitudinal members;
   a floor pan coupled to and above at least a portion of the longitudinal members, wherein a battery pack bay is defined below the floor pan, longitudinally between predefined front and rear limits, and laterally between the longitudinal members;
   a first battery pack disposed within the battery pack bay, the battery pack comprising a pair of laterally spaced apart sides whereat the first battery pack is removably attached to the respective longitudinal members, the first battery pack dimensioned longitudinally to occupy less than the entire longitudinal space of the battery pack bay; and
   a closeout structure removably attached to the respective longitudinal members and one longitudinal end of the first battery pack.

2. The battery electric vehicle of claim 1, wherein the closeout structure comprises a cross-braced panel.

3. The battery electric vehicle of claim 1, wherein the closeout structure comprises at least one hat bracket attached to the closeout structure and removably attached to the floor pan.

4. The battery electric vehicle of claim 1, wherein the closeout structure comprises a lateral member at a longitudinal end opposite the one longitudinal end of the first battery pack and removably attached to the floor pan between the longitudinal members.

5. The battery electric vehicle of claim 1, wherein the longitudinal members comprise a plurality of mounting provisions distributed along substantially the entire lengths thereof and configured for removable attachment of a second battery pack dimensioned to occupy substantially the entire longitudinal space of the battery pack bay.

6. The battery electric vehicle of claim 1, wherein the longitudinal members comprise a set of mounting provisions distributed substantially along the entire lengths thereof and configured for removable attachment of a first battery pack dimensioned longitudinally to occupy substantially the entire longitudinal space of the battery pack bay, the first battery pack being removably attached to the respective longitudinal members at a first sub-set of the mounting provisions, the closeout structure removably attached to the respective longitudinal members at a second subset of the mounting provisions.

7. The battery electric vehicle of claim 1, wherein the pair of spaced apart and substantially parallel longitudinal members comprise rocker assemblies.

8. The battery electric vehicle of claim 1, wherein the first battery pack is positioned between the spaced apart longitudinal members fully forward in the longitudinal space of the battery pack bay, and the closeout structure is positioned between the spaced apart longitudinal members and between the one longitudinal end of the first battery pack and the predefined rear limit.

9. The battery electric vehicle of claim 1, wherein the first battery pack is positioned between the spaced apart longitudinal members fully rearward in the longitudinal space of the battery pack bay, and the closeout structure is positioned between the spaced apart longitudinal members and between the one longitudinal end of the first battery pack and the predefined front limit.

10. The battery electric vehicle of claim 1, wherein the first battery pack is positioned between the spaced apart longitudinal members intermediate in the longitudinal space of the battery pack bay, and the closeout structure is positioned between the spaced apart longitudinal members and between the other end of the first battery pack and the other of the predefined front and rear limits opposing the other end of the first battery pack.

11. A method for configuring a battery electric vehicle, comprising:
providing a vehicle structure comprising a battery pack bay beneath a floor pan of the vehicle, including predefined front and rear limits defining an available longitudinal space of the battery pack bay and an available lateral space between a pair of spaced apart longitudinal members;
selectively assembling the vehicle in one of a first configuration and a second configuration;
wherein assembling the vehicle in the first configuration comprises installing a first battery pack to the spaced apart longitudinal members, the first battery pack being dimensioned to occupy substantially the entire available longitudinal space of the battery pack bay; and
wherein assembling the vehicle in the second configuration comprises installing a second battery pack to the spaced apart longitudinal members, the second battery pack being dimensioned to occupy less than the entire available longitudinal space of the battery pack bay, installing a first closeout structure to the spaced apart longitudinal members and to one longitudinal end of the second battery pack, and extending the first closeout structure substantially to the one of the predefined front and rear limits opposing the one longitudinal end of the second battery pack.

12. The method of claim 11, wherein installing the first and second battery packs comprises removably installing the battery packs.

13. The method of claim 11, wherein assembling the vehicle in the second configuration comprises installing the second battery pack between the spaced apart longitudinal members fully forward in the longitudinal space of the battery pack bay, and installing the first closeout structure between the spaced apart longitudinal members and between the one longitudinal end of the second battery pack and the predefined rear limit.

14. The method of claim 11, wherein assembling the vehicle in the second configuration comprises installing the second battery pack between the spaced apart longitudinal members fully rearward in the longitudinal space of the battery pack bay, and installing the first closeout structure between the spaced apart longitudinal members and between the one longitudinal end of the second battery pack and the predefined front limit.

15. The method of claim 11, wherein assembling the vehicle in the second configuration comprises installing the second battery pack between the spaced apart longitudinal members intermediate in the longitudinal space of the battery pack bay, and installing a second closeout structure between the spaced apart longitudinal members and between the other end of the second battery pack and the other of the predefined front and rear limits opposing the other end of the second battery pack.

16. A battery electric vehicle, comprising:
a pair of spaced apart and substantially parallel longitudinal members;
a floor pan coupled to and above at least a portion of the longitudinal members, wherein a battery pack bay is defined below the floor pan, laterally between the longitudinal members and longitudinally between predefined front and rear limits;
the longitudinal members comprising a set of mounting provisions distributed substantially along the entire lengths thereof and configured to receive fasteners to removably secure one of a first battery pack or a combination of a second battery pack and a closeout structure, the first battery pack dimensioned to occupy substantially the entire longitudinal space of the battery pack bay between the front and rear limits, the second battery pack dimensioned to occupy less than the entire available longitudinal space of the battery pack bay between one of the front and rear limits and a longitudinal position intermediate the front and rear limits, and the closeout structure dimensioned to cover at least a majority of the battery pack bay between the intermediate longitudinal position and the other of the front and rear limits.

17. The battery electric vehicle of claim 16, wherein the pair of spaced apart and substantially parallel longitudinal members comprise rocker assemblies.

18. The battery electric vehicle of claim 17, wherein the mounting provisions comprise weld nuts.

\* \* \* \* \*